June 25, 1929.  L. VAN GILDER  1,718,803
WATER METER
Filed Nov. 3, 1924
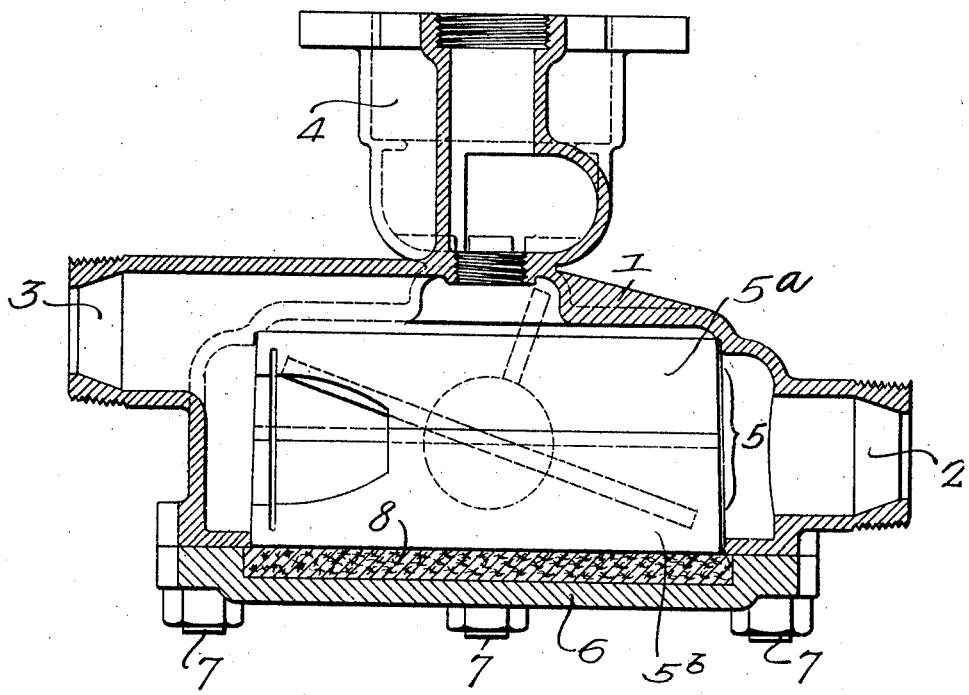
Inventor.-
Lincoln Van Gilder.
by his Attorneys.-
Howson & Howson Patented June 25, 1929.

1,718,803

UNITED STATES PATENT OFFICE.

LINCOLN VAN GILDER, OF ATLANTIC CITY, NEW JERSEY.

WATER METER.

Application filed November 3, 1924. Serial No. 747,656.

One object of my invention is to provide relatively simple, inexpensive and effective means for preventing injury to apparatus such as liquid measuring devices, in case the liquid therein should freeze, and the invention especially has to do with a novel construction of water meter whereby damage from solidification of the contained water shall be effectually prevented.

It is further desired to provide a device for protecting water meters from injury due to freezing, which may be readily and quickly applied to existing meters without involving serious change.

These objects and other advantageous ends I attain as hereinafter set forth, reference being had to the accompanying drawings, in which:

The figure is a vertical section of a water meter illustrating my invention as applied thereto.

In the above drawings, 1 represents the body or main casing of a water meter having an inlet 2, an outlet 3 and provided with a gear chamber 4 of any suitable construction. The registering mechanism and gear train, forming no part of the present invention, are omitted.

The bottom face or side of the casing 1 is open to permit of the insertion and removal of the measuring chamber 5, which is of the separable displacing type comprising top and bottom sections $5^a$ and $5^b$ having a loose or vertically slidable connection permitting relative movement of the sections, and in accordance with my invention, this side or face is closed by a plate or cover 6, usually held to the main casing by nuts mounted on studs 7. The inner face of this cover is hollowed or recessed for the reception of a plate or block 8 of elastic material upon which the chamber 5 rests and which, like cork for example, does not absorb appreciable amounts of water nor seriously deteriorate with time.

With the above construction, if the water within the meter casing or measuring chamber should freeze the resilient or elastic body 8 will be compressed sufficiently to permit of the expansion of the water and of the ice as the temperature is lowered beyond its point of maximum density, so that no abnormal stresses are brought to bear on any part of the mechanism, on the casing, on the bolts, or on the measuring chamber. When the ice melts or the excess pressure is relieved, the plate or block 8 returns to substantially its original volume and the meter at once resumes its normal functions.

The mass of the elastic body 8 is such as to permit of the above described action when the liquid is being cooled or is frozen, without permitting objectionable abnormal pressures within the meter casing, and in order to prevent or retard the deterioration of the plate or block 8, it may be given a coating of water-resisting or repelling material such as water-proof varnish or it may be impregnated with water-proofing material such as paraffin, which will accomplish the same end without interfering with its characteristic property of yielding under injuriously high pressures and thereafter returning to substantially its original volume when such pressures are removed.

It is, of course, obviously immaterial whether new meters be equipped with bottom closure plates and elastic closing elements, as shown in the drawing, or whether such closure plates and elastic cushions be substituted for the ordinary bottom cover plates in meters already in service.

I claim:

1. The combination in a water meter, of a casing; a measuring chamber movably housed in the casing; and a body of cork in the casing constituting a support for said chamber.

2. A water meter comprising a casing having a recess in the interior; a block of cork mounted in said recess; and a measuring chamber seated upon the said block.

3. The combination, in a water meter, of a casing, a measuring chamber movably housed in the casing, and a body of compressible elastic material supporting the chamber and completely filling the space beneath the latter.

4. The combination, in a water meter, of a casing having a recess, a body of compressible elastic material mounted in the recess, and a measuring chamber movably housed in the casing and supported by said body.

5. The combination, in a water meter, of a casing having a recess, a body of compressible elastic material completely filling said recess, and a measuring chamber movably mounted on said body, said body presenting to said chamber an area at least as large as the bottom of the chamber.

6. The combination, in a water meter, of a casing, a measuring chamber movably housed in the casing, and a body of cork supporting the chamber and entirely filling the space beneath the latter.

LINCOLN VAN GILDER.